May 27, 1924.
E. G. VON GUNTEN
MILK FILTERING MACHINE
Filed Sept. 3, 1921
1,495,825
3 Sheets-Sheet 3
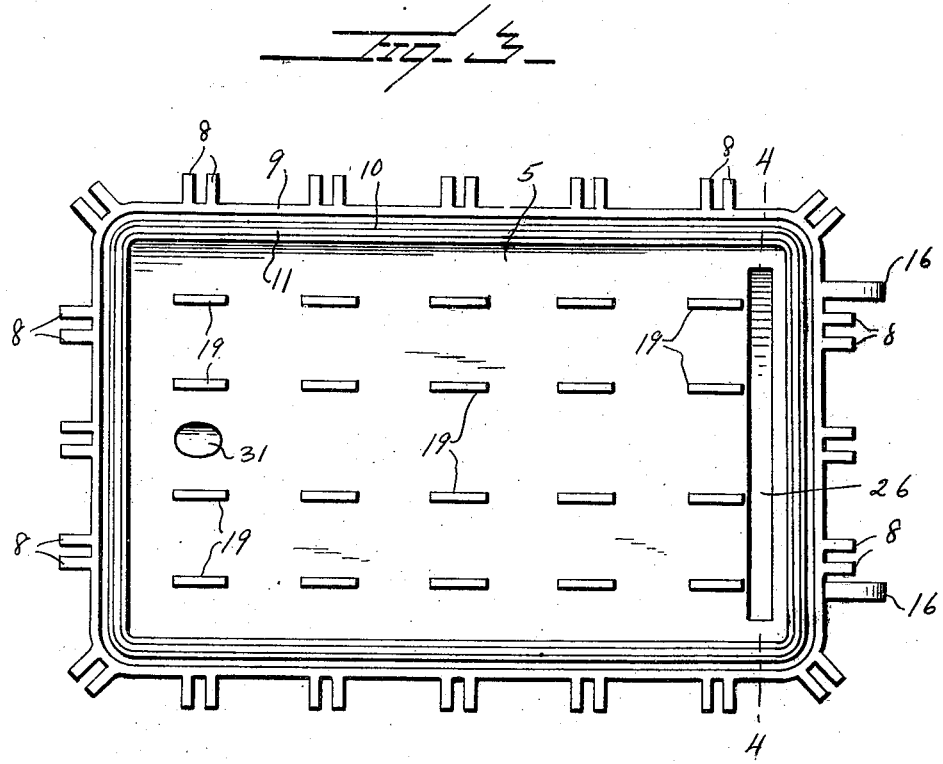
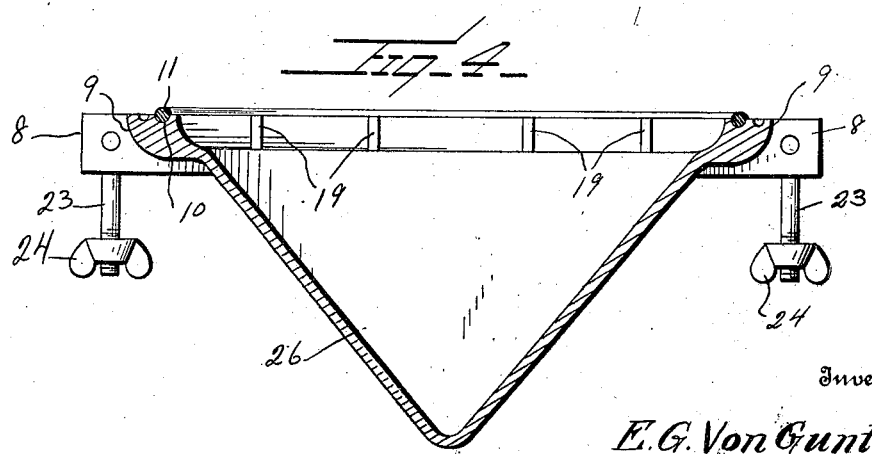
Inventor
E. G. Von Gunten
By Watson E. Coleman
Attorney Patented May 27, 1924.

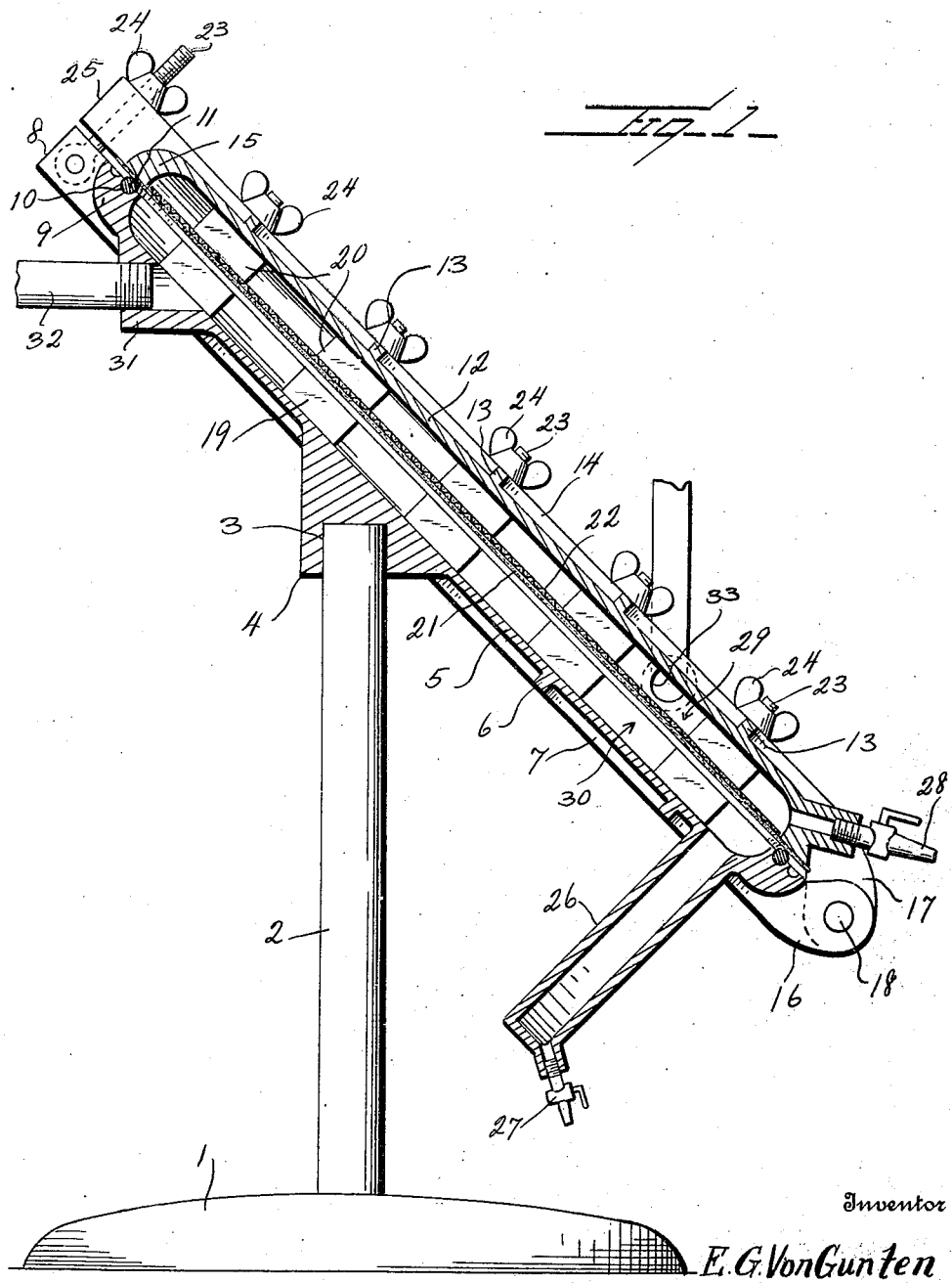

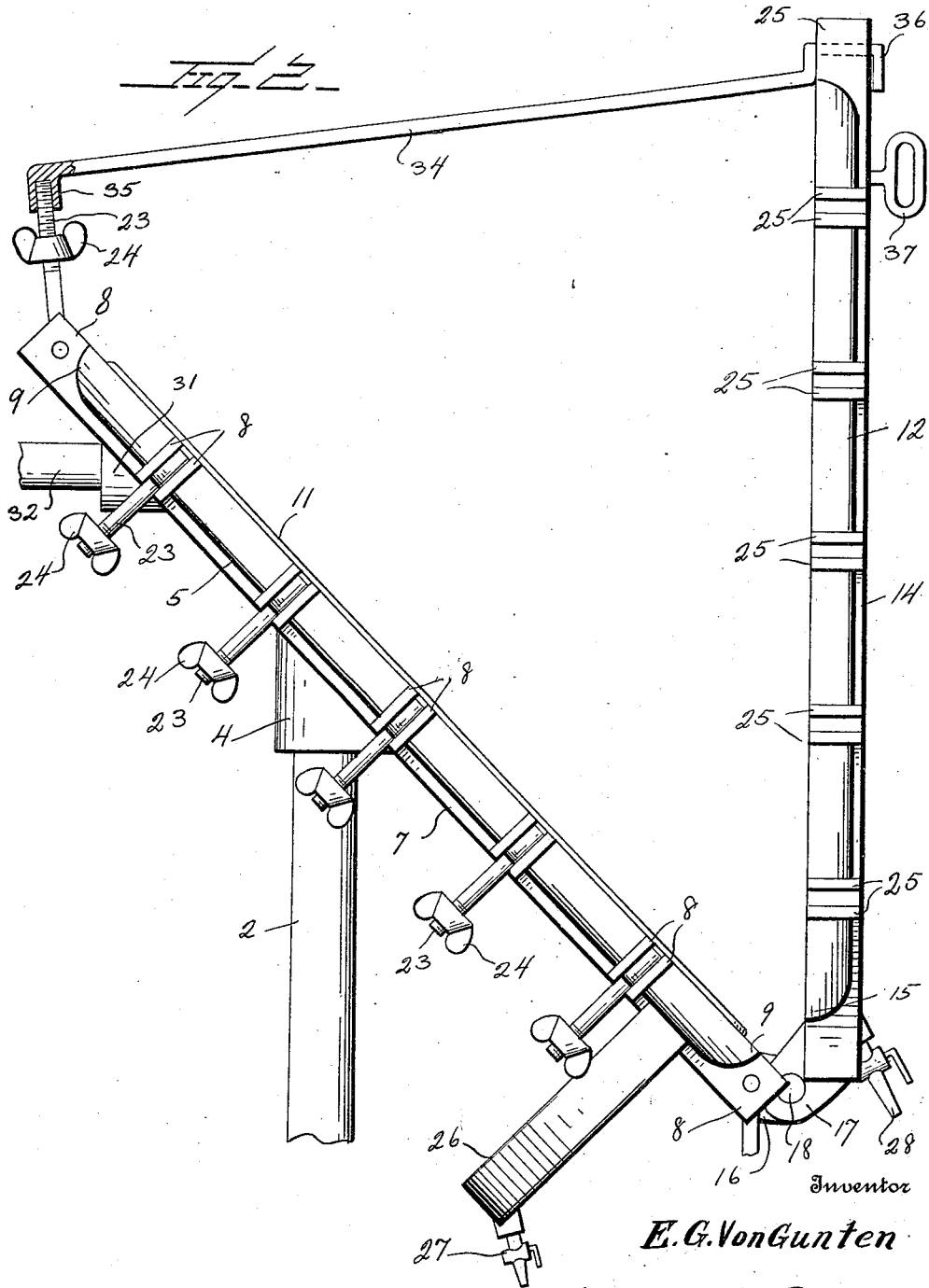

1,495,825

UNITED STATES PATENT OFFICE.

EDWARD G. VON GUNTEN, OF AKRON, OHIO.

MILK-FILTERING MACHINE.

Application filed September 3, 1921. Serial No. 498,342.

*To all whom it may concern:*

Be it known that I, EDWARD G. VON GUNTEN, a citizen of the United States, residing at Akron, in the county of Summit and State of Ohio, have invented certain new and useful Improvements in Milk-Filtering Machines, of which the following is a specification, reference being had to the accompanying drawings.

This invention relates to milk filtering or straining machines and one of the principal objects of the invention is to provide a machine so constructed that the milk in entering the machine to be passed through the filtering or straining medium will keep the surface of the straining medium clean and all sediment and foreign matter will be conducted away from the contact face of the filtering medium so that the milk will be passed through a relatively clean filtering cloth at all times instead of straining the milk through the dirt which accumulates on the filtering medium as is now customary.

In all horizontal types of machines the milk is brought directly into contact with the under surface of the filtering cloth with the idea that the sediment contained in the milk will fall away from the cloth. This, however, has been found to be an incorrect theory for the sediment so collects upon the under side of the cloth that the machine clogs and it is necessary to stop operation and replace the filtering medium.

It is therefore the object of this invention to avoid this difficulty and, broadly speaking, the invention consists in directing the milk at an angle to the plane of the filtering medium so that the contact surface thereof is always kept in a clean state and the sediment conducted away to a point of discharge by gravity.

Another object of the invention is the provision of a filtering machine in which the filtering medium is arranged at an angle of approximately 45° to the milk feed so that the sediment carried by the milk is not retained upon the fabric but washed off of the contact surface thereof and carried away to a point of discharge.

A still further object of the invention is the provision of novel means for supporting the filtering fabric in operative position whereby it is effectively held away from contact with either the top or bottom plate of the machine and whereby it may be readily removed and renewed when desirable.

A still further object of the invention is the provision of a machine in which the top and bottom halves employed for retaining the filtering medium in position may be held in relatively separated positions while the machine is open for washing and renewal of the filtering medium.

Further objects of the invention will appear as the following specific description is read in connection with the accompanying drawings which form a part of this application and in which:

Figure 1 is a view partly in vertical section and partly in elevation of a filtering or straining machine constructed in accordance with an embodiment of my invention;

Figure 2 is a view partly in side elevation and partly in section of my improved machine with certain of the parts in a second position;

Figure 3 is a view in top plan of the bottom plate as herein embodied; and

Figure 4 is a view partly in section and partly in elevation of the sediment chamber and the parts concomitant thereto.

Referring more particularly to the drawings, 1 represents the supporting base from which rises the standard 2 engaged removably or otherwise in the socket 3 formed in a lug 4 carried upon or integral with the bottom plate 5 of the machine. This bottom plate, as shown in Figure 1, is constructed preferably of relatively light material and has formed integrally therewith the transverse and longitudinal ribs 6 and 7 terminating at their ends in bifurcated extensions or forks 8, the purpose of which will be hereinafter described. The ribs 6 and 7 reinforce and stiffen the entire base plate which, as shown in Figure 1, is provided with a marginal upstanding flange 9 having a groove 10 in its upper surface to receive the circular rubber packing 11 against which the filtering medium is pressed by the top plate 12. As shown in Figure 1, the top plate is also reinforced by transverse and longitudinal ribs 13 and 14 and is provided on its under side with a marginal flange 15 which rests upon the filtering fabric, as will be hereinafter described, and presses the same into firm engagement with the packing 11.

The lower end of the bottom plate 5 is provided with a pair of pivot lugs 16 which correspond with similar lugs 17 formed upon the top plate 12 and which are connected together by the pins 18 so that the upper and lower halves or the top and bottom plates are hinged together and are adapted to move to open position, as shown in Figure 2, when it is desired to renew the filtering fabric or wash the machine.

The lower plate 5 is provided with a plurality of spaced rows of lugs 19 integrally formed therewith and arranged perpendicular thereto, and the upper plate 12 is provided with similarly positioned lugs 20 arranged directly opposite the lugs 19 and slightly spaced therefrom when the plates are in closed position, as shown in Figure 1, so as to receive the filtering medium 21 and the retaining member 22. This retaining member is in the form of a heavy screen or perforated plate and is of sufficient strength to withstand the pressure of the milk against the filtering fabric and prevents the filtering fabric from being carried into contact with the top plate by the pressure of the milk thereagainst. When the filtering fabric is in position, as shown in Figure 1, the upper and lower halves or plates 5 and 12 are clamped together, as will be now described.

Pivoted between the forks 8 on the ends and side of the bottom plate 5 are eye bolts 23 carrying thumb nuts 24 on their threaded free ends. These eye bolts are adapted to be positioned between similar forks 25 forming extensions of the reinforcing ribs 13 and 14 of the top plate. When all of the eye bolts are engaged with the forks 25 and the thumb nuts screwed down thereon the flange 15 will be jammed against the filter 21 and the packing 11 thus effectually holding the filtering medium in place and producing a fluid tight container. It is of course to be understood that the pivotal connection of the lugs 16 and 17 is of such character as to permit slight relative movement so that the packing may be compressed at the hinged end of the plates.

Depending from a point adjacent the lower end of the plate 5 is a sediment chamber 26 having attached to the forward wall thereof a drain cock 27 by which the sediment may be removed from the chamber at intervals, as required in practice. From an inspection of Figure 4 it will be noticed that this chamber is substantially V-shaped in form, its upper end which opens into the space between the plates 5 and 12 extending entirely across the plate while its sides are tapered so that at the point of connection of the cock 27 the chamber is narrowed down to a point whereby all sediment will be washed through the cock 27 when open.

When it is desired to wash the machine it is first necessary to drain the upper half or upper compartment of the machine and in order to do this I provide a drain cock 28 connected to the upper plate 12 and communicating with the upper compartment indicated at 29, the lower compartment being indicated at 30.

The lower plate 5 is provided adjacent the upper end thereof with an internally threaded nipple 31 to receive a feed pipe 32 usually connected with the feed pump from the pasteurizer to the aerator and the upper plate is provided with an outlet nipple 33 connected to a discharge pipe which is led to any suitable point.

In order that the halves may be held in separated relation in position for washing the machine and removing and replacing the filtering cloth, I provide a brace arm 34 provided at one end with a longitudinally extended and internally threaded arm 35 which is screwed upon the central eye bolt 23 in the upper end of the lower half 5. The brace 34 has its opposite end provided with a rectangular hook 36 which is of sufficient size to engage over the upper half 12 and its related flange 15 and support the upper half in the position shown in Figure 2. The brace 34, as shown, is adapted to be guided in its movements by sliding in between the arms of the fork 25 which corresponds to and is adapted to receive the eye bolts 23 to which the brace is attached. In this manner all that is necessary is to disconnect the eye bolts from the upper half and raise the same by the hand hold 37, the brace being guided in the fork 25 until the upper half reaches the hook 36 at which time the brace drops so as to engage the hook over the upper half and hold the halves in spaced relation. The filtering cloth may then be removed with the retaining member 22 and both properly sterilized or a new cloth and retaining member placed in position. After the hook has been released and the upper half lowered into engagement with the lower half and clamped into position, as will be readily understood, feed from the pump can be started and the operation of filtering the milk resumed.

It will be noticed that as the milk strikes the filtering medium at an angle and with considerable force all sediment particles are washed from the contact surface of the cloth and carried downwardly to the sediment chamber 26 where the sediment may be discharged at predetermined intervals, preferably after the filtering of each thousand gallons of milk.

What I claim is:

1. A filtering apparatus comprising two elongated plates adapted so that one will overlie the other, the marginal portions of the plates being defined by inwardly disposed flanges, a filtering element interposed between the plates when in super-imposed relation and clamped between the flanges of the plates, means for supporting the plates in an inclined position, the lower plate adjacent its upper end being provided with an induction opening, the upper plate adjacent its lower end being provided with an eduction opening, the lower plate adjacent its lower end and below the eduction opening of the upper plate being provided with an opening extending substantially entirely thereacross, a sediment chamber depending from the lower plate and in communication with the space between both of the plates through the last named opening in the lower plate, and a drain cock in communication with the lower portion of the sediment chamber.

2. A filtering apparatus comprising two elongated plates adapted so that one will overlie the other, the marginal portions of the plates being defined by inwardly disposed flanges, a filtering element interposed between the plates when in super-imposed relation and clamped between the flanges of the plates, means for supporting the plates in an inclined position, the lower plate adjacent its upper end being provided with an induction opening, the upper plate adjacent its lower end being provided with an eduction opening, the lower plate adjacent its lower end and below the eduction opening of the upper plate being provided with an opening extending substantially entirely thereacross, a sediment chamber depending from the lower plate and in communication with the space between both of the plates through the last named opening in the lower plate, drain cock in communication with the lower portion of the sediment chamber, said sediment chamber being perpendicularly related to the lower plate.

3. A filtering apparatus comprising two elongated plates adapted so that one will overlie the other, the marginal portions of the plates being defined by inwardly disposed flanges, a filtering element interposed between the plates when in super-imposed relation and clamped between the flanges of the plates, means for supporting the plates in an inclined position, the lower plate adjacent its upper end being provided with an induction opening, the upper plate adjacent its lower end being provided with an eduction opening, the lower plate adjacent its lower end and below the eduction opening of the upper plate being provided with an opening extending substantially entirely thereacross, a sediment chamber depending from the lower plate and in communication with the space between both of the plates through the last named opening in the lower plate, a drain cock in communication with the lower portion of the sediment chamber, said sediment chamber being substantially V-shaped in elevation with the drain cock positioned at the apex portion thereof.

4. A filtering apparatus comprising two elongated plates adapted so that one will overlie the other, the marginal portions of the plates being defined by inwardly disposed flanges, a filtering element interposed between the plates when in super-imposed relation and clamped between the flanges of the plates, means for supporting the plates in an inclined position, the lower plate adjacent its upper end being provided with an induction opening, the upper plate adjacent its lower end being provided with an eduction opening, the lower plate adjacent its lower end and below the eduction opening of the upper plate being provided with an opening extending substantially entirely thereacross, a sediment chamber depending from the lower plate and in communication with the space between both of the plates through the last named opening in the lower plate, a drain cock in communication with the lower portion of the sediment chamber, and a drain cock carried by the upper plate and in communication with the space between both of the plates at a point below the eduction opening of the upper plate.

5. A filtering apparatus comprising two elongated plates adapted so that one will overlie the other, the marginal portions of the plates being defined by inwardly disposed flanges to provide a chamber when the plates are in overlying relation, supporting means engaging the lower plate for holding the assembled plates in an inclined position, a filter element intersecting the chamber between the plates and clamped between the flanges of the plates, the lower plate adjacent its upper end being provided with an induction opening, the upper plate adjacent its lower end being provided with an eduction opening, means for holding the plates in superimposed relation, and means for pivotally connecting adjacent ends of the plates.

In testimony whereof I hereunto affix my signature.

EDWARD G. VON GUNTEN.